(No Model.)

P. SCHNEIDER.
SPOKE SOCKET.

No. 519,273.                    Patented May 1, 1894.

WITNESSES:
Fred G. Dieterich
Jos. A. Ryan

INVENTOR
Philipp Schneider
BY Munn & Co
ATTORNEYS.

UNITED STATES PATENT OFFICE.

PHILIPP SCHNEIDER, OF CHATTANOOGA, TENNESSEE, ASSIGNOR OF ONE-HALF TO GEORGE C. WITTE, OF SAME PLACE.

SPOKE-SOCKET.

SPECIFICATION forming part of Letters Patent No. 519,273, dated May 1, 1894.

Application filed January 11, 1894. Serial No. 496,537. (No model.)

*To all whom it may concern:*

Be it known that I, PHILIPP SCHNEIDER, of Chattanooga, in the county of Hamilton and State of Tennessee, have invented a new and Improved Spoke-Saver, of which the following is a specification.

My invention relates to an improved socket or protecting housing for the ends of the spokes where they enter the felly, and it has for its object to provide a device of this character, simple and inexpensive, which can be readily attached to ordinary wheel spokes, and which will effectively serve for its intended purposes, and such invention consists in the peculiar and novel construction of parts, hereinafter first described, and then particularly pointed out in the appended claims, reference being had to the accompanying drawings, in which—

Figure 1:
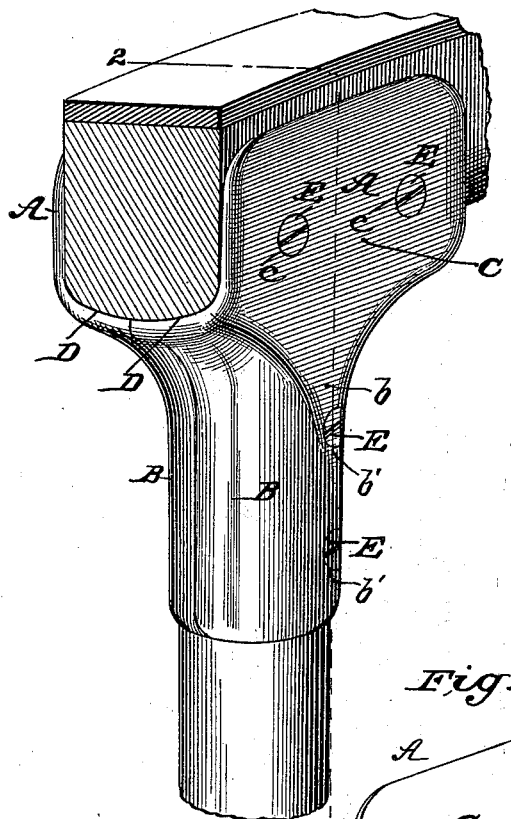
Figure 2:
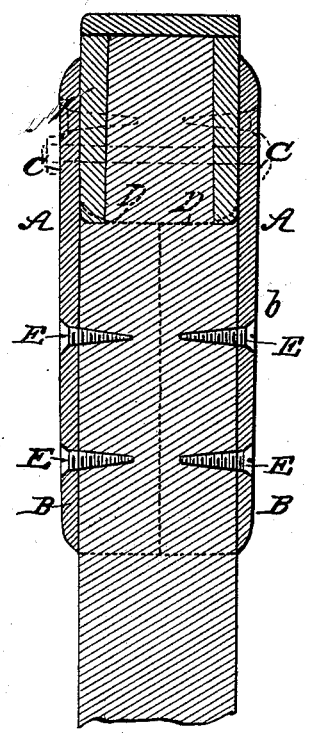

Figure 1 is a perspective view of my improved spoke saving device, as applied for use. Fig. 2 is a vertical longitudinal section of the same on the line 2—2 Fig. 1, and Fig. 3 is a detail perspective of one of the plates hereinafter referred to detached.

In use the spokes of vehicle wheels frequently wear loose at their felly ends, and when so loosened sand and grit enters the felly sockets and soon wears away and weakens the ends of the spokes, and renders them liable to be easily snapped or broken at such end, by any unusual lateral strain or shock on the wheel. This objection I overcome by the construction shown in the accompanying drawings, which consists of a socket like body formed of two half sections A A, each of which is formed of a semi-circular end portion B, its rear wall $b$, terminating in a laterally extended flattened head C, while the front edges terminate at the lower end of such head portion, and are laterally extended into wings or seat portions D, which merge into the head portion as most clearly shown in Fig. 3, such head and socket portion having screw apertures $c$ and $b$, through which the fastening screws E pass as shown in Fig. 1.

Figure 3:
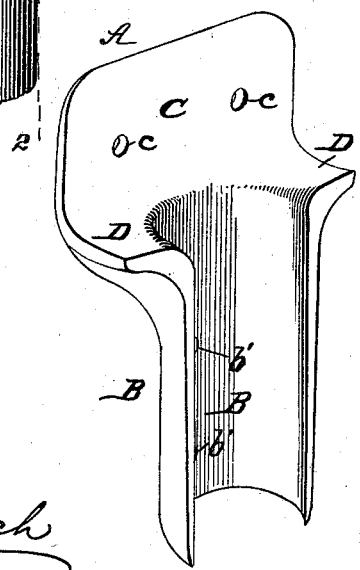

The manner in which my devices are applied for use will be readily understood by reference to Figs. 1 and 3. It will be noticed the socket portions embrace the spoke at the felly end, and are secured thereto, while the seat portions D fit under the felly, and the head C projected over the sides thereof and secured thereto by the screws $c$.

By providing a reinforce and protecting device as described, for the spokes, the same will be securely held in the felly sockets, and will prevent the dirt from entering the socket and thereby effectually preventing the spokes becoming quickly worn or weakened.

It will be understood that in practice bolts may be used to secure the upper socket portions, in such case they are passed through the felly as shown in dotted lines Fig. 2.

Having thus described my invention, what I claim, and desire to secure by Letters Patent, is—

An improved spoke saver or protector comprising two half sections each formed with a semi-circular lower or end portion B, constructed to have their adjacent edges join to completely encircle the spoke when fitted thereon, having a straight rear wall and terminating at the top in a laterally extending flattened head portion C, the front edges of such portions being extended laterally, to form wings or seat portions D, which merge into the head portion, said head and circular portions having screw apertures, all arranged substantially in the manner shown and for the purposes described.

PHILIPP SCHNEIDER.

Witnesses:
M. A. WOODS,
FRED KRIEGNER.